US009076021B2

(12) United States Patent
Pittelko

(10) Patent No.: US 9,076,021 B2
(45) Date of Patent: Jul. 7, 2015

(54) ENCRYPTION/DECRYPTION FOR DATA STORAGE SYSTEM WITH SNAPSHOT CAPABILITY

(75) Inventor: Michael H. Pittelko, Chaska, MN (US)

(73) Assignee: Compellent Technologies, Eden Prairie, MN (US)

( * ) Notice: Subject to any disclaimer, the term of this patent is extended or adjusted under 35 U.S.C. 154(b) by 210 days.

(21) Appl. No.: 13/550,191

(22) Filed: Jul. 16, 2012

(65) Prior Publication Data

US 2014/0019769 A1  Jan. 16, 2014

(51) Int. Cl.
G06F 21/62 (2013.01)
G06F 21/78 (2013.01)
G06F 21/80 (2013.01)
H04L 29/08 (2006.01)
H04L 29/06 (2006.01)
G06F 11/14 (2006.01)

(52) U.S. Cl.
CPC ............ *G06F 21/78* (2013.01); *G06F 21/6218* (2013.01); *G06F 11/1448* (2013.01); *G06F 2201/84* (2013.01); *G06F 21/805* (2013.01); *G06F 2221/2107* (2013.01); *H04L 67/1097* (2013.01); *H04L 63/0428* (2013.01)

(58) Field of Classification Search
CPC .............................. G06F 21/78; G06F 21/6218
See application file for complete search history.

(56) References Cited

U.S. PATENT DOCUMENTS

| 6,938,162 | B1 * | 8/2005 | Nagai et al. | 713/189 |
| 7,613,945 | B2 | 11/2009 | Soran et al. | |
| 8,447,037 | B2 * | 5/2013 | Noh et al. | 380/277 |
| 2006/0005017 | A1 * | 1/2006 | Black et al. | 713/165 |
| 2009/0164470 | A1 * | 6/2009 | Savage et al. | 707/9 |
| 2010/0042832 | A1 * | 2/2010 | Fujibayashi et al. | 713/165 |
| 2010/0142710 | A1 * | 6/2010 | Chrysler et al. | 380/277 |
| 2011/0283113 | A1 * | 11/2011 | Moffat et al. | 713/189 |

* cited by examiner

Primary Examiner — Gilberto Barron, Jr.
Assistant Examiner — Malcolm Cribbs
(74) Attorney, Agent, or Firm — Winthrop & Weinstine, P.A.

(57) ABSTRACT

A method for managing access to encrypted data of a data storage system storing snapshot data, a snapshot providing a previous point-in-time copy of data in a volume of the data storage system, wherein the data storage system utilizes changing encryption keys for write data. For each snapshot, the method stores at least one decryption key identifier for each decryption key corresponding to an encryption key utilized to encrypt data written to a volume since a previous snapshot was committed to disk, and associates the at least one decryption key identifier with the snapshot. A key table associating decryption key identifiers with corresponding decryption keys is provided, and based on the key table and the at least one decryption key identifier associated with the snapshot, one or more decryption keys required for accessing encrypted data associated with the snapshot are determined. Decryption key identifiers may be stored in snapshot metadata.

16 Claims, 3 Drawing Sheets

ENCRYPTION/DECRYPTION FOR DATA STORAGE SYSTEM WITH SNAPSHOT CAPABILITY

FIELD OF THE INVENTION

The present disclosure generally relates to data encryption and decryption in a data storage system. Particularly, the present disclosure relates to encryption and decryption of snapshot data or historical data in a data storage system. Even more particularly, the present disclosure relates to novel and advantageous encryption/decryption key management for snapshot data or historical data in a data storage system.

BACKGROUND OF THE INVENTION

As more and more types of data are stored electronically, data encryption is becoming increasingly important. For example, more and more personal and private information is being transferred across networks and stored in databases and other storage devices, such as storage area networks (SANs). Similarly, increasing regulation on the storage of corporate data has led to more scrutiny in protection of that data.

Various storage technologies exist that are suitable to store and protect such sensitive data, and extend from basic desktop solutions to enterprise SAN solutions. In conventional encryption methods, algorithmic schemes are used to transform the data, based on an encryption key, to a form that is generally non-readable to unauthorized parties without access to the key and the proper algorithmic schemes. To decrypt the encrypted data, a decryption key, which may be symmetric or asymmetric to the encryption key, is used to trigger an algorithm mechanism to decrypt the data, transforming it back to the original readable version. In this regard, the decryption key is required to properly access the data, and as such, the decryption key is typically securely maintained and is accessible to, retrievable by, or otherwise known to parties authorized to access the data. In further encryption methods, the encryption key may cycle or change over time, thus providing an additional layer of security to the data stored, as the cycling or changing keys make it more difficult for unauthorized users, or even past authorized users who are no longer authorized, to hack into and access the encrypted data. As the keys cycle, a reencryption process may be utilized to convert the data encrypted with the old key to data encrypted with the new key. While the reencryption process is active, a key manager may be used to monitor which data has been encrypted with which of the cycling or changing keys.

In conventional data storage systems, the encryption methods, and particularly cycling or changing encryption key methods, did not need to address the problems that arise with snapshots, and thus, disk-to-disk backup, disk-to-SAN backup, or other backup was relatively simple. With non-cycling or non-changing encryption key methods, the data could simply be replicated to the backup storage. However, with cycling or changing encryption keys, if an encrypted backup copy of the data is required or desired, the entire storage system could not simply be replicated in the encrypted form, as the keys will continue to cycle and the data in the backup copy will gradually become inaccessible due to disassociation with the proper key identifiers. Nonetheless, backup remained relatively simple. To make a backup copy of the data, the entire storage system could be decrypted utilizing the key manager to identify the appropriate keys, the backup could be re-encrypted with a new key (or the current cycled key), and the key manager could associate the new key with the backup data. However, this is plainly very time consuming, as it requires decryption and encryption of all the data in the portion of the data storage system being backed up.

In relatively recent years, however, the introduction of snapshots or point-in-time copies (PITCs) have provided increased benefits for data storage systems and the manner in which historical data can be efficiently stored, identified, and used. However, with the introduction of snapshots or PITCs, the complexity of the manners by which encryption and decryption methods utilizing cycling or changing keys may be applied has also increased. For example, the traditional reencryption process, identified above, is very time consuming, and thus it is relatively inevitable that snapshots will continue to be committed to disk during the reencryption process. Accordingly, where a snapshot is committed during execution of a reencryption cycle caused by a key change, the snapshot is committed with data encrypted by multiple (two or more) keys. Traditionally, the old key(s) may be discarded since all current data will be reencrypted with the new key. However, the historical snapshot, being committed during the reencryption process and prior to all data being reencrypted with the new key, will retain portions of data that would be inaccessibly encrypted utilizing the old key(s). Even if the old key is retained, unless the correct portions of the snapshot were associated with the correct key(s), portions of the snapshot would remain inaccessibly decrypted.

Accordingly, there is a need in the art, in data storage systems having snapshot capabilities, for improved encryption and decryption methods utilizing cycling or changing keys which are cognizant of the need or desire to maintain accessibility of historical snapshots or PITCs and their corresponding associations with the cycling or changing encryption/decryption keys.

BRIEF SUMMARY OF THE INVENTION

The present disclosure, in one embodiment, relates to a method for managing access to encrypted data of a data storage system storing snapshot data to a computer-readable storage medium, a snapshot or combination of snapshots providing a previous point-in-time copy of data in a volume of the data storage system, wherein the data storage system utilizes changing encryption keys to store write data to the computer-readable storage medium. The method includes, for each snapshot, storing in the computer-readable storage medium, at least one decryption key identifier for each decryption key corresponding to an encryption key utilized to encrypt data written to a volume since a previous snapshot was committed to disk, and associating the at least one decryption key identifier with the snapshot. The method further includes providing a key table associating decryption key identifiers with corresponding decryption keys, and based on the key table and the at least one decryption key identifier associated with the snapshot, determining one or more decryption keys required for accessing encrypted data associated with the snapshot. The decryption key identifiers may be stored in metadata for a snapshot. In some embodiments, the method may also include providing the one or more decryption keys determined as required for accessing the encrypted data associated with the snapshot to a requester of the encrypted data such that the requester can decrypt the encrypted data. In alternate embodiments, the method may include decrypting the encrypted data using the one or more decryption keys determined as required for accessing the encrypted data associated with the snapshot such that decrypted data can be provided to a requester of the encrypted data. The decryption keys and corresponding encryption keys may be symmetric or asymmetric. In some embodiments, the encryption key is changed each time a snapshot is committed to disk as read-only, such that each snapshot is associated with a corresponding different decryption key identifier. In some embodiments, a snapshot may identify only the write data for a volume between the times when it is committed to disk as read-only and when a previous snapshot was committed to disk as read-only.

The present disclosure, in another embodiment, relates to a data storage system having a computer-readable storage medium storing snapshot data, wherein one or more snapshots provide a read-only previous point-in-time copy of data in a volume of the data storage system, and each snapshot is associated with at least one decryption key identifier identifying each decryption key corresponding to an encryption key utilized to encrypt data written to the volume since a previous snapshot was committed to disk. An encryption module may be provided for encrypting write data stored to the volume utilizing changing encryption keys, and a key table may associate decryption key identifiers with corresponding decryption keys, from which one or more decryption keys required for accessing encrypted data associated with a given snapshot can be determined based on the decryption key identifiers associated with the given snapshot. The snapshots may comprise metadata, and the decryption key identifiers for s snapshot may be stored in the metadata for that snapshot. In one embodiment, a decryption module may be included for providing the one or more decryption keys determined as required for accessing the encrypted data associated with the given snapshot to a requester of the encrypted data such that the requester can decrypt the encrypted data. In alternate embodiments, the decryption module may decrypt the encrypted data associated with the given snapshot using the one or more decryption keys determined as required for accessing the encrypted data such that decrypted data can be provided to a requester of the encrypted data. As noted above, the decryption keys and corresponding encryption keys may be symmetric or asymmetric. In some embodiments, the encryption key is changed each time a snapshot is committed to disk as read-only, such that each snapshot is associated with a corresponding different decryption key identifier. A snapshot may identify only the write data for a volume between the times when it is committed to disk as read-only and when a previous snapshot was committed to disk as read-only.

The present disclosure, in still another embodiment, relates to a method for managing access to encrypted data of a data storage system storing snapshot data to a computer-readable storage medium, the data storage system utilizing changing encryption keys to store write data to the computer-readable storage medium. The method may include managing data writes to a data storage device of the data storage system using point-in-time copies (PITCs), an active PITC being a PITC handling all writes to the data storage device, and managing all decryption key identifiers for each decryption key corresponding to an encryption key utilized to encrypt data written to the data storage device while a PITC is active. Upon committing an active PITC to disk as read-only and demoting the PITC from active status, all of the managed decryption key identifiers may be associated with the demoted PITC. A key table may be used to associate decryption key identifiers with corresponding decryption keys. Based on the key table and at least one decryption key identifier associated with a given demoted PITC, one or more decryption keys required for accessing encrypted data associated with the given demoted PITC may be determined. All decryption key identifiers associated with a demoted PITC may be stored in metadata for that PITC.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous data encryption and decryption in a data storage system. Particularly, the present disclosure relates to novel and advantageous encryption and decryption of snapshot data or historical data in a data storage system. Even more particularly, the present disclosure relates to novel and advantageous encryption/decryption key management for snapshot data or historical data in a data storage system.

The systems and methods of the present disclosure may be particularly useful in the context of a disk drive system, or virtual disk drive system, such as that described in U.S. Pat. No. 7,613,945, titled "Virtual Disk Drive System and Method," issued Nov. 3, 2009, the entirety of which is hereby incorporated herein by reference. Such disk drive systems allow the efficient storage of data by dynamically allocating the data across a page pool of storage, or a matrix of disk storage blocks, and a plurality of disk drives based on RAID-to-disk mapping. They may protect data from, for example, system failures or virus attacks by automatically generating and storing snapshots or point-in-time copies of the system or matrix of disk storage blocks at, for example, predetermined time intervals, user configured dynamic time stamps, such as, every few minutes or hours, etc., or at times directed by the server. These time-stamped snapshots permit the recovery of data from a previous point in time prior to the system failure, thereby restoring the system as it existed at that time. These snapshots or point-in-time data may also be used by the system or system users for other purposes, such as but not limited to, testing, while the main storage can remain operational. Generally, using snapshot capabilities, a user may view the state of a storage system as it existed in a prior point in time.

Figure 1:
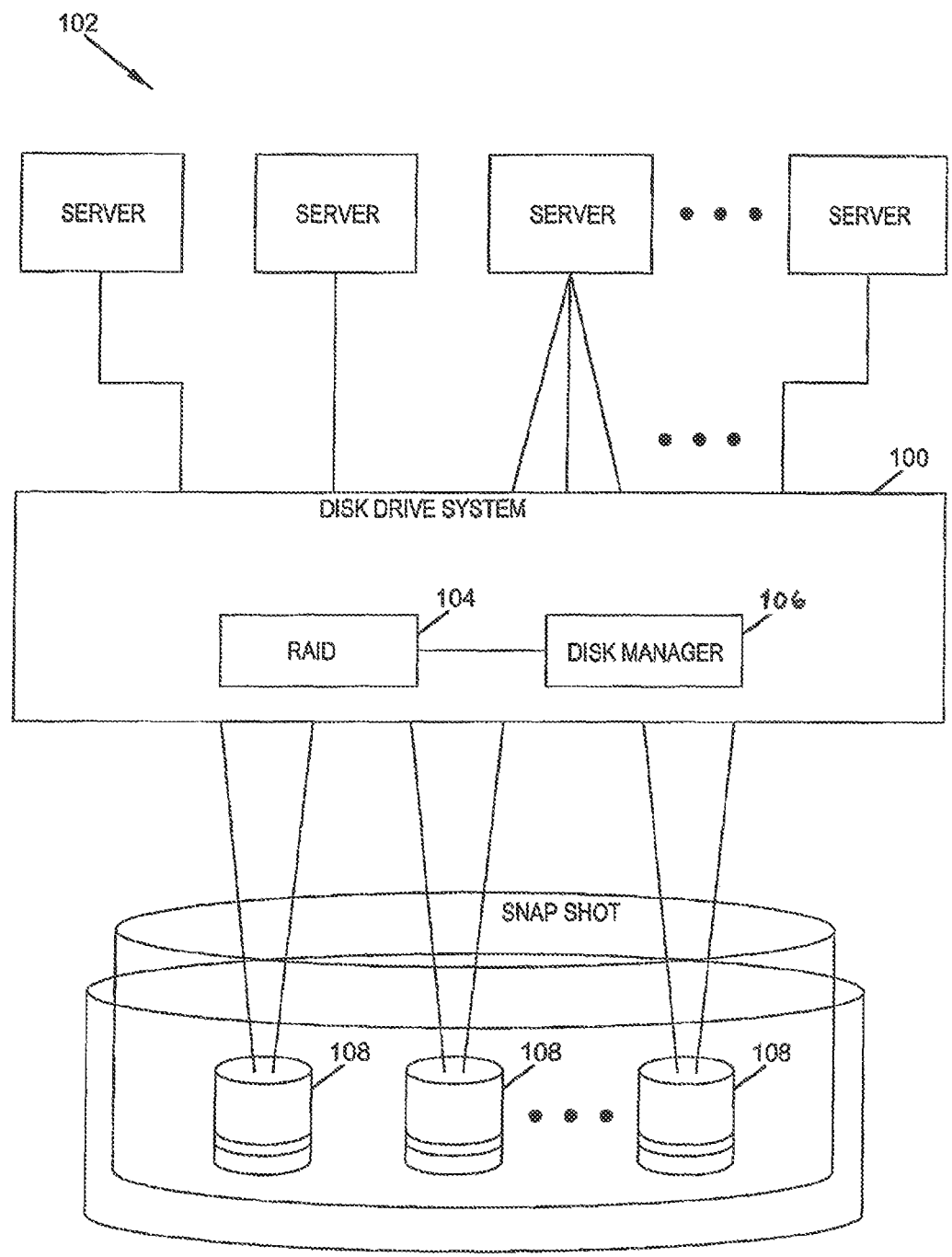
FIG. 1 is a schematic of a disk drive system suitable with the various embodiments of encryption and decryption of the present disclosure.

FIG. 1 illustrates one embodiment of a disk drive system 100 in a computer environment 102, such as that disclosed in U.S. Pat. No. 7,613,945, and suitable with the various embodiments of the present disclosure. As shown in FIG. 1, the disk drive system 100 may include a data storage subsystem 104, which may include a RAID subsystem, as will be appreciated by those skilled in the art, and a disk manager 106 having at least one disk storage system controller. The data storage subsystem 104 and disk manager 106 can dynamically allocate data across disk space of a plurality of disk drives 108 based on, for example, RAID-to-disk mapping or other storage mapping technique.

As generally described above, the disk storage system 104 may automatically generate a snapshot(s) or point-in-time copy(ies) of the system, or a matrix of disk storage blocks or volume(s) thereof. A snapshot may include a record of write operations to, for example, a volume so that a "view" may subsequently be created to see the contents of a volume in the past, such as for data recovery. A Logical Block Address (LBA) remapping layer may be added to a data path within the virtualization layer, and may therefore provide another layer of virtual LBA mapping within the 110 path. The snapshot or PITC need not copy all volume information, and instead, in some embodiments, may merely modify a table that the remapping layer uses. Snapshot capabilities of the disk storage system 104 may include, but are not limited to, creating snapshots, managing snapshots, coalescing snapshots, and controlling I/O operations of the snapshots.

Figure 2:
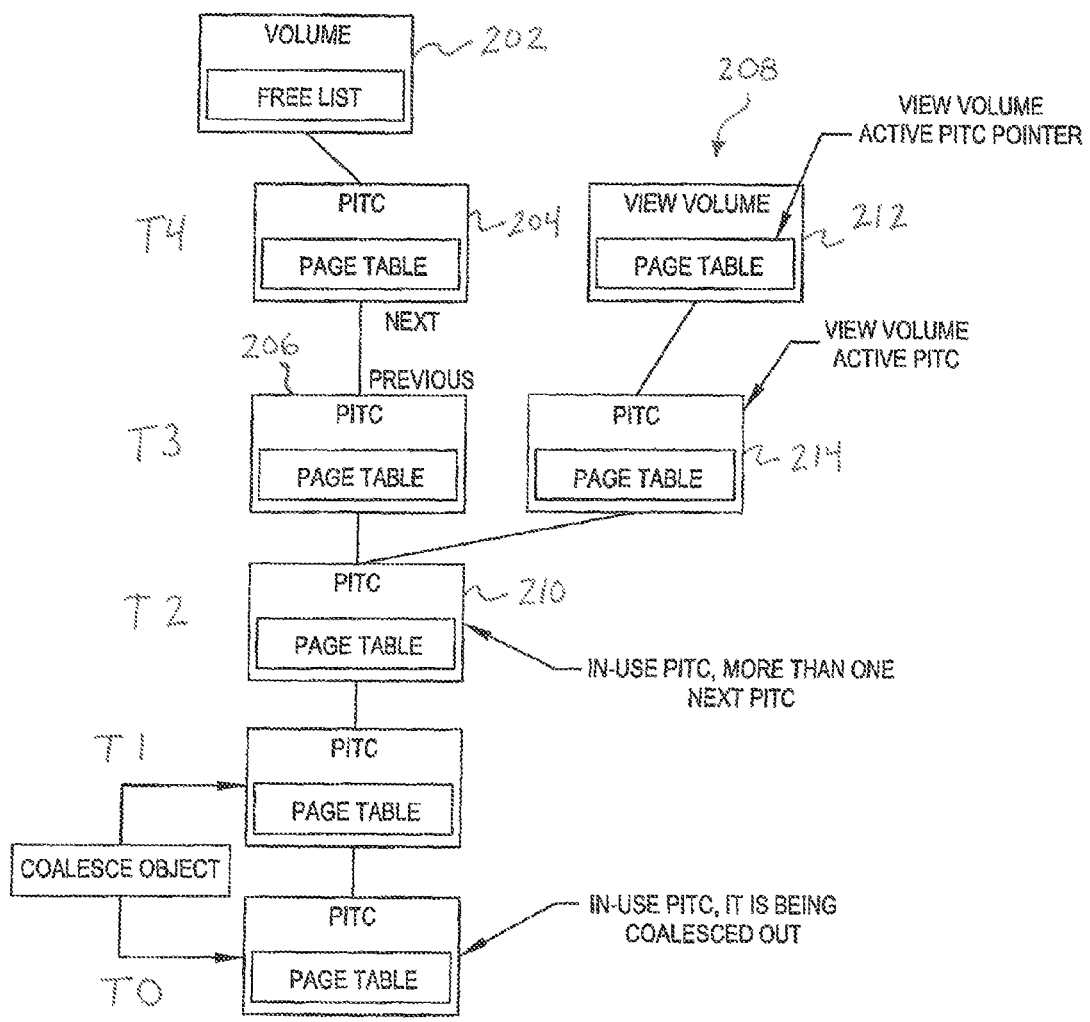
FIG. 2 is a schematic of snapshot scheme according to one embodiment of the present disclosure.

FIG. 2 illustrates one embodiment of a snapshot scheme, as described in U.S. Pat. No. 7,613,945. As illustrated in FIG. 2, a top-level snapshot or PITC for a volume, or a view volume as will be described below, may be an active snapshot or PITC (AP) 202. The AP 202 may satisfy all read and write requests to the volume. In many embodiments, the AP is the only snapshot or PITC for the volume that may accept write requests. The AP 202 may contain a summary of data page pointers for the entire volume.

The next snapshot level down from the AP 202 may be the most recently active snapshot or PITC that is no longer active. In the embodiment shown, the snapshot 204 was taken or committed at time T4. The next most recent snapshot or PITC 206 was taken or committed at time T3. The pattern may continue for snapshots or PITCs taken at times T2, T1, and T0. The number of snapshots or PITCs shown in FIG. 2 are for illustration purposes only. Of course, there could be fewer or many more snapshots than that shown.

FIG. 2 also illustrates that a view volume 208 may subsequently be created to see or view the contents of a volume as they were at some point in the past. In general, view volumes provide access to previous points-in-time and can support normal volume I/O operations. A view volume PITC may track the difference between the original PITC from which the view volume was generated, and the view volume allows the user to access the information contained within the original PITC without modifying the underlying data of the original PITC. In this sense, a view volume branches from the PITC from which it was generated and may support such actions as, but not limited to, recovery, test, backup operations, etc. In the example shown, the view volume 208 may be created from snapshot or PITC 210, which was taken at T2. Thus, the view volume 208 provides a view of the volume as it was at time T2. The view volume may initially be an active snapshot or PITC and may satisfy all read and write requests to the view volume. However, a view volume 208 may also take advantage of snapshot capabilities and have snapshots or PITCs of its own similarly generated at predetermined time intervals, user configured dynamic time stamps, such as, every few minutes or hours, etc., or at times directed by the server. In this regard, the view volume may include an active PITC 212 and one or more snapshots or PITCs, e.g., 214, that were generated at previous points in time. In many embodiments, the active PITC for the view volume is the only snapshot or PITC for the view volume that may accept write requests.

During a basic life cycle of a snapshot or PITC, the snapshot or PITC may go through a number of following states before it is committed as read-only:

1. Create page table—Upon creation of the PITC, a page table may be created.

2. Commit space for PITC to disk—This generates the storage on the disk for the PITC. By writing the table at this point, it may ensure that the required space to store the table information is allocated before the PITC is taken. At the same time, the PITC object may also committed to the disk.

3. Accept I/O—As the AP, it may now handle read and write requests for the volume. In many embodiments, this is the only state that accepts write requests to the table.

4. Commit PITC table to disk as read-only—The PITC is no longer the AP, and no longer accepts additional pages. A new AP has taken over. In some embodiments, the table will no longer change unless it is removed during a coalesce operation with one or more other snapshots or PITCs. In this sense, it is read-only.

5. Release table memory—Frees any extra memory that the table required in order to release available resources.

As described above, in conventional encryption methods, algorithmic schemes are used to transform the data, based on an encryption key, to a form that is generally non-readable to unauthorized parties without access to the key and the proper algorithmic schemes. To decrypt the encrypted data, a decryption key, which may be symmetric or asymmetric to the encryption key, is used to trigger an algorithm mechanism to decrypt the data, transforming it back to the original readable version. In cycling or changing encryption key methods, the encryption key is cycled or changed as time passes, thus providing an additional layer of security to the data stored. A key manager is used to manage which data has been encrypted with which of the cycling or changing keys.

In conventional data storage systems, the encryption methods, and particularly cycling or changing encryption key methods, did not need to address the problems that arise when snapshots or PITCs, such as those described above, are introduced into the data storage system. Thus, disk-to-disk backup, disk-to-SAN backup, or other backup was relatively simple.

While the introduction of snapshots or PITCs has provided increased benefits for data storage systems and the manner in which historical data can be efficiently stored, identified, and used, snapshots or PITCs have also increased the complexity of the manners by which encryption and decryption methods utilizing cycling or changing keys may be applied. The encryption/decryption methods of the present disclosure are cognizant of the need or desire to maintain accessibility of historical snapshots or PITCs and their corresponding associations with the cycling or changing encryption/decryption keys, and desirably, can provide encryption/decryption utilizing cycling or changing keys without substantial additional burden on the key manager. In this regard, the present disclosure improves encryption/decryption key management for snapshot data or historical data in a data storage system, such as but not limited to the type of data storage system described in U.S. Pat. No. 7,613,945. Of course, it is recognized, however, that the various embodiments of the present disclosure could be applied in any suitable data storage system utilizing snapshot or PITC technologies, or other similar technologies, and application of the various embodiments of the present disclosure are not limited to the data storage system described in U.S. Pat. No. 7,613,945.

As stated above, a snapshot or PITC may include a record of write operations to, for example, a volume so that a "view" may subsequently be created to see the contents of a volume in the past. In this regard, the snapshot or PITC need not copy all volume information, and instead, in some embodiments, may merely modify a table that a remapping layer may use to recreate the volume as it stood at the desired previous point in time. As such, snapshots or PITCs are more complex than simple replication of the data for backup storage, and thus the conventional methods for simple disk-to-disk backup, disk-to-SAN backup, or other backup with encrypted data, as noted above, are not generally suitable. It is because of the nature of snapshots and PITCs and their functionality that each snapshot or PITC needs to maintain the integrity and accessibility of the data stored therein (directly or via pointers, as would be recognized by those skilled in the art) until the time at which it is coalesced and/or released (often based on administrator rules). Accordingly, there needs to be a manner by which to preserve the key or keys required to decrypt the data while the snapshot or PITC was the AP or otherwise were required at the point in time that the snapshot or PITC was committed to disk (typically committed as read-only) and to maintain the association between the decryption key(s) and the snapshot or PITC. If the key(s) is/are not preserved or the associations between the key(s) and the snapshot or PITC are not maintained, as the encryption keys continue to cycle or change for active data and/or the active data is passed through a reencryption process, as discussed above, the data in the snapshot or PITC may gradually become inaccessible due to disassociation with the proper key(s).

Figure 3:
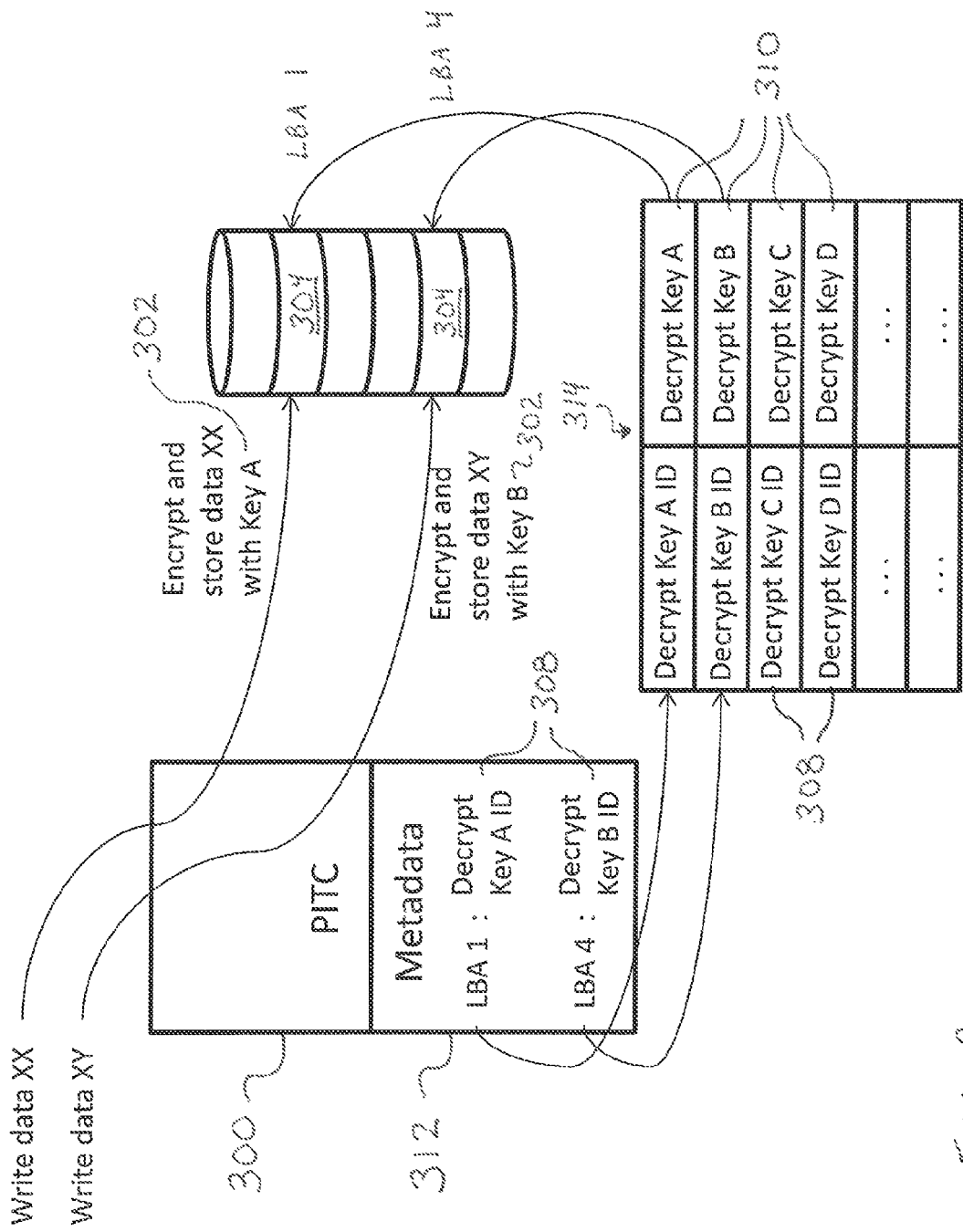
FIG. 3 is a schematic of data encryption and decryption in a data storage system utilizing snapshot capabilities.

Accordingly, in one embodiment of the present disclosure, schematically illustrated in FIG. 3, while a PITC 300 is the AP, data writes may be encrypted utilizing one or more encryption keys 302, including cycling or changing encryption keys, and the encrypted data 304 may be stored on one or more data storage devices 306, such as disk drives, solid state drives, RAID devices, etc. When the snapshot or PITC 300 is committed to disk as read-only or is otherwise no longer the AP, the identifier(s) 308 for any decryption key or keys 310 corresponding to the encryption keys 302 used to encrypt data written to the data storage system while the snapshot or PITC was the AP, or otherwise since the previous snapshot was taken, may be stored with the snapshot or PITC, such as but not limited to, in the metadata 312 for the snapshot or PITC. In further embodiments, as illustrated in FIG. 3, each portion or subset of the snapshot or PITC, identified for example by logical block address (LBA) ranges, may each be associated with the corresponding decryption key identifier 308, and such association may also be stored in the metadata 312. As such, each snapshot or PITC, or each subset (i.e., LBA range) thereof, will have access to the appropriate key identifiers, via its metadata, required to decrypt the data associated with the snapshot or PITC, regardless of whether the data being decrypted remains current data, or has since been replaced with newer data in one or more subsequent APs. A key table 314, database, or other relationship algorithm, or a key manager, may be used to associate the key identifiers 308 with the corresponding decryption keys 310, which as stated above may be, for example, symmetric or asymmetric with the corresponding encryption keys 302.

In use, if at any time the administrator, a user(s), or a server, etc. wants to access or "view" the contents of a volume as they were at some past point in time, such as for data recovery, testing, etc., the appropriate key identifiers 308 for each of one or more snapshots or PITCs 300 required to access and decrypt the data needed to recreate the volume at that desired point in time may be accessed from the metadata 312 of those one or more snapshots or PITCs and provided to the requesting user system, server, switch, or the like, or to a controller of the data storage system. The server, controller, or other device, may then obtain the corresponding decryption keys 310 from the key table 314 or through a key manager, or the like, and utilize the corresponding decryption keys to properly decrypt and access the encrypted data 304 stored in or identified by the snapshots or PITCs. A similar process for encryption and decryption may be applied to view volumes, described above.

The various embodiments of the present disclosure provide advantages over prior conventional encryption and decryption methods in that the various embodiments disclosed herein permit uninhibited use of snapshot capabilities and all the benefits achieved therewith, as discussed in further detail in U.S. Pat. No. 7,613,945, while providing the increased level of security achieved by encrypting data for both active and historical data.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

I claim:

1. A method for managing access to encrypted data of a data storage system storing snapshot data to a computer-readable storage medium, a snapshot or combination of snapshots providing a previous point-in-time copy of data in a volume of the data storage system, wherein changing encryption keys are used to encrypt data stored to the computer-readable storage medium, the method comprising:

for a given snapshot:
storing in the computer-readable storage medium of the data storage system, encrypted snapshot data for the snapshot and a decryption key identifier for a decryption key corresponding to an encryption key utilized to encrypt data written to a volume to which the snapshot is associated since a previous snapshot associated with the volume was committed to disk, the decryption key identifier being an identifier of the decryption key while not being a decryption key itself; and
associating the decryption key identifier with the snapshot; and
upon request for the encrypted snapshot data by a requesting system operably connected to the data storage system via a network, providing the decryption key identifier associated with the snapshot wherein the requesting system uses a key table stored separate from the computer-readable storage medium and associating decryption key identifiers with corresponding decryption keys to determine the decryption key required for accessing the encrypted snapshot data associated with the snapshot.

2. The method of claim 1, wherein the decryption key identifier is stored in metadata for the snapshot.

3. The method of claim 2, wherein the decryption key and corresponding encryption key are symmetric.

4. The method of claim 2, wherein the decryption key and corresponding encryption key are asymmetric.

5. The method of claim 1, wherein the snapshot identifies only write data for a volume between the times when it is committed to disk as read-only and when a previous snapshot associated with the volume was committed to disk as read-only.

6. The method of claim 5, wherein the encryption key is changed each time a snapshot is committed to disk as read-only, such that each snapshot is associated with a corresponding different decryption key identifier.

7. A data storage system comprising:
a computer-readable storage medium storing snapshots and decryption key identifiers, wherein one or more snapshots provide a read-only previous point-in-time copy of data in a volume of the data storage system, and each snapshot comprises encrypted snapshot data and is associated with a decryption key identifier stored on the computer-readable storage medium identifying a decryption key corresponding to an encryption key utilized to encrypt data written to the volume since a previous snapshot was committed to disk, the decryption key identifier not being a decryption key itself; and
a network connection operably connecting the data storage system with a requesting system, such that upon request for the encrypted snapshot data of a given snapshot by the requesting system, the decryption key identifier associated with the given snapshot is provided via the network connection wherein the requesting system uses a key table stored separate from the computer-readable storage medium and associating decryption key identifiers with corresponding decryption keys to determine the decryption key required for accessing the encrypted snapshot data associated with the given snapshot.

8. The system of claim 7, wherein each snapshot comprises metadata and the decryption key identifier for a snapshot is stored in the metadata for that snapshot.

9. The system of claim 8, wherein each decryption key and corresponding encryption key are symmetric.

10. The system of claim 8, wherein each decryption key and corresponding encryption key are asymmetric.

11. The system of claim 7, wherein each of the one or more snapshots providing a read-only previous point-in-time copy of data in a volume of the data storage system identifies only write data for the volume between the times when that snapshot is committed to disk as read-only and when a previous snapshot associated with the volume was committed to disk as read-only.

12. The system of claim 7, wherein the encryption key is changed each time a snapshot is committed to disk as read-only, such that each snapshot is associated with a corresponding different decryption key identifier.

13. A method for managing access to encrypted data of a data storage system storing snapshot data to a computer-readable storage medium, in which changing encryption keys are used to encrypt data stored to the computer-readable storage medium, the method comprising:
managing data writes to the data storage system using point-in-time copies (PITCs), an active PITC being a PITC handling all writes to a volume of the data storage system;
for each volume:
managing decryption key identifiers for that volume, each decryption key identifier identifying a decryption key corresponding to an encryption key utilized to encrypt data written to that volume, the decryption key identifier not being a decryption key itself; and
upon committing an active PITC for that volume to disk as read-only and demoting the active PITC from active status, associating, with the demoted PITC, each managed decryption key identifiers corresponding to an encryption key utilized to encrypt data written to that volume while the demoted PITC was active; and
upon request for encrypted data from the demoted PITC by a requesting system operably connected to the data storage system via a network, providing a decryption key identifier associated with the demoted PITC wherein the requesting system uses a key table stored separate from the computer-readable storage medium and associating decryption key identifiers with corresponding decryption keys.

14. The method of claim 13, wherein decryption key identifiers associated with a demoted PITC are stored in metadata for that PITC.

15. The method of claim 1, further comprising:
for a given snapshot:
storing in the computer-readable storage medium of the data storage system, encrypted snapshot data for the snapshot and a decryption key identifier for each of a plurality of decryption keys, each corresponding to an encryption key utilized to encrypt data written to a volume to which the snapshot is associated since a previous snapshot associated with the volume was committed to disk, each decryption key identifier being an identifier of a decryption key while not being a decryption key itself; and
associating the decryption key identifiers with the snapshot; and
upon request for the encrypted snapshot data by a requesting system operably connected to the data storage system via a network, providing at least one of the decryption key identifiers associated with the snapshot wherein the requesting system uses the key table to determine at least one decryption key required for accessing the encrypted snapshot data associated with the snapshot.

16. The system of claim 7, wherein:
at least one snapshot comprises encrypted snapshot data and is associated with a plurality of decryption key identifiers stored on the computer-readable storage medium, each decryption key identifier identifying a decryption key corresponding to an encryption key utilized to encrypt data written to the volume since a previous snapshot was committed to disk, each decryption key identifier not being a decryption key itself; and
the network connection operably connects the data storage system with the requesting system, such that upon request for the encrypted snapshot data of a given snapshot by the requesting system, at least one decryption key identifier associated with the given snapshot is provided via the network connection wherein the requesting system uses the key table to determine at least one decryption keys required for accessing the encrypted snapshot data associated with the given snapshot.

* * * * *

UNITED STATES PATENT AND TRADEMARK OFFICE
CERTIFICATE OF CORRECTION

PATENT NO. : 9,076,021 B2
APPLICATION NO. : 13/550191
DATED : July 7, 2015
INVENTOR(S) : Michael H. Pittelko It is certified that error appears in the above-identified patent and that said Letters Patent is hereby corrected as shown below:

In the Specification

Column 5, Line 16, delete "110" and insert --I/O-- therefor.

Column 7, Line 37, delete "306".

Signed and Sealed this
Third Day of November, 2015

Michelle K. Lee
*Director of the United States Patent and Trademark Office*